Patented Feb. 21, 1950

2,498,605

UNITED STATES PATENT OFFICE 2,498,605

SYNTHETIC FIBER PREPARATION

George E. Ham, Dayton, Ohio, assignor to Monsanto Chemical Company, St. Louis, Mo., a corporation of Delaware No Drawing. Application January 29, 1948,
Serial No. 5,191

6 Claims. (Cl. 260—30.4)

This invention relates to a new method of preparing synthetic fibers from polymers and copolymers of acrylonitrile. More particularly the invention relates to a new solvent for acrylonitrile polymers, and to completely miscible mixtures including acrylonitrile polymers from which mixtures high tenacity fibers can readily be produced by extrusion methods.

It is well known that polyacrylonitrile and copolymers of acrylonitrile have excellent fiber forming properties. The conventional technique for preparing fibers from acrylonitrile polymers involves the dissolution of the polymer in a suitable solvent and thereafter the extruding of the solution through an orifice into a medium which removes the solvent from the solution and precipitates the solid acrylonitrile polymer in a long continuous body. Although many such solvents have been proposed, the use of most of them is impractical by reason of the cost of the solvent, or by reason of the slight solubility, the excessive viscosity of the resulting solution, or the gel-like nature of the solvent-polymer mixtures.

The primary purpose of this invention is to provide new solvents of exceptionally low cost, which are available in unlimited quantities, and which have exceptionally desirable solubility and viscosity characteristics. A further purpose of this invention is to provide a new method for spinning acrylonitrile polymers to form fibers of high tensile strength and desirable elongation.

It has been found that acid anhydrides which have unsubstituted six member rings are excellent solvents for polyacrylonitrile and copolymers of acrylonitrile. Thus, maleic anhydride and succinic anhydride are very useful as solvents yet very similar compounds, such as itaconic anhydride, crotonic anhydride, and chloromaleic anhydride are entirely ineffective.

The anhydrides of maleic and succinic acid are capable of dissolving polyacrylonitrile and copolymers of more than 75 percent by weight acrylonitrile and minor proportions of one or more other monomers capable of copolymerization therewith. Suitable comonomers are vinyl acetate, vinyl propionate, vinyl chloride, the alkyl acrylates and alkyl methacrylates, acrylamide, methacrylamide, acrylic acid, methacrylic acid, and methacrylonitrile.

A very desirable class of copolymers useful in the practice of this invention are the copolymers of 75 to 97 percent of acrylonitrile, 2 to 18 percent of methacrylonitril and from one to 10 percent of vinyl acetate. These copolymers are described and claimed in co-pending application, Serial No. 786,153, filed November 14, 1947, by Reid G. Fordyce and George E. Ham.

Other desirable polymers useful in the practice of this invention are the copolymers of monomeric mixtures of more than 75 percent by weight acrylonitrile and up to 25 percent of other mono-olefinic monomers which tend to improve the spinability of polymeric acrylonitrile when copolymerized therewith. Most important of these comonomers is vinyl acetate. Copolymers of 80 to 99 percent of acrylonitrile and from one to 20 percent of the other monomers, for example vinyl acetate, are excellent fiber forming polymers which have very desirable spinning properties, especially when spun from maleic anhydride or succinic anhydride solutions in accordance with this invention.

In the practice of this invention, as it is in the preparation of all acrylonitrile fibers, the molecular weight of the polymer is of critical importance. The polymer should have a molecular weight in excess of 10,000, and preferably in excess of 25,000. These molecular weights are determined by measuring the viscosity of the polymer when dissolved in a suitable solvent, such as dimethyl formamide, in the manner well known to the art. It is also very desirable to use acrylonitrile copolymers which are substantially uniform throughout with respect to the chemical composition and physical structure. Such uniform copolymers enable the practice of the invention more economically, permitting the utilization of continuous uninterrupted spinning and greatly minimizing fiber fractures and clogging of the spinnerettes.

In the practice of this invention the polymers of acrylonitrile are used in finely divided form. Although massive polymers may be ground to desired particles, preferably emulsion polymerization procedures are employed in the preparation of the polymer. The subdivided states of the polymers obtained by spray drying the emulsions, or by precipitation and subsequent drying of the solid polymers enable them to be used directly. The finely divided polymer is mixed with maleic or succinic anhydrides in any type of mixing device, such as a dough mixer or a homogenizer. Generally it is desirable to heat to a temperature between the melting point of the anhydride, and the boiling or sublimation temperature. Maleic anhydride dissolutions preferably utilize temperatures of 100 to 150° C., whereas succinic anhydride is more effective at 150 to 200° C. It is desirable to use a solution of as high a concentration of the polymer as possible, but the maximum concentration is dependent upon the molecular weight of the polymer.

To obtain fibers of optimum physical properties polymers of molecular weights in excess of 25,000 are used, and when using such polymers it is only possible to dissolve from 5 to 35 percent in the anhydride without exceeding practicable viscosity values. Although as low as five percent of the polymer can be used in spinning operations, such concentrations are undesirable because they necessitate the removal and recovery of too much solvent from the extruded solution, thereby increasing solvent recovery cost and reducing spinning speeds by reason of the longer periods required for coagulation. The concentration of the polymer in the anhydride solution is prefereably between 7 and 25 percent but will ultimately be determined by considering the desired physical properties of the fiber and the speed of spinning, which speed is a function of the concentration and viscosity of the anhydride solution. The viscosity will depend upon the chemical composition and the molecular weight of the polymers. The optimum proportions can best be determined by selecting a uniform molecular weight polymer having good fiber forming properties and dissolving it in the smallest amount of the anhydride necessary to form a viscous solution capable of extrusion at convenient temperatures which must necessarily be in excess of the melting point of the anhydride.

The fibers are spun by extruding the anhydride solution of the acrylonitrile polymer through an orifice, or a spinnerette having a plurality of orifices, into a medium which removes the solvent. The volume of the solution passed through the spinnerette per unit of time must be constant in order to produce a fiber of uniform size. This is best achieved by using a positively driven gear pump constructed of corrosion resistant metals, such as stainless steel, and adapted to deliver a constant flow of solution regardless of minor changes in viscosity and regardless of the resistance offered by the spinnerette. It is also desirable to pass the solution through one or more filters before reaching the spinnerette in order to remove all possible traces of foreign matter and particles of incompletely dissolved polymer. The polymer solution may be delivered to the gear pump by means of pressure applied by an inert gas to the liquid surface of the solution reservoir, which must be heated to maintain the solution fluid enough to pass through the conduits. The gear pump, filter devices and conduits to the spinnerette are preferably heat insulated and may be heated to maintain the body of solution in liquid state. The extruding operation should be conducted at temperatures well above the melting point of the anhydride and far enough below the sublimation point or boiling point of the anhydride to prevent bubbles or other irregularities in the fiber.

The medium into which the solution is extruded and which removes the solvent may be either liquid or gaseous. The method involving the use of liquids is known as "wet spinning" and usually utilizes aqueous media having dissolved therein alkaline reagents, which convert the anhydride to water soluble salts. The spin bath may be any liquid which is a non-solvent for the acrylonitrile polymer but which either dissolves the anhydride, or converts it into a salt soluble in that medium. The anhydride is leached out of the stream of polymer solution, which first becomes a viscous stream and finally a solid filament. When a spinnerette with a plurality of apertures is used the several streams of polymer converge and ultimately form a single fiber. The spin bath must necessarily be of sufficient size to permit the complete, or substantially complete, removal of the anhydride. Obviously the rapidity of extrusion will affect the size of the spin bath, high speeds requiring much longer baths. The temperature of the bath also affects the size, higher temperatures permitting more rapid diffusion of the anhydride from the fiber and enabling the use of shorter baths. Higher alkali concentration in the spin bath also permits the use of shorter baths. Obviously the recovery of anhydride from the spin bath after wet spinning operations will involve neutralization, drying and distillation.

The use of maleic or succinic anhydride as solvents for acrylonitrile polymers is particularly adaptable to "dry spinning" operations, wherein air, steam, nitrogen or other gas, or mixtures of gases which are inert at the spin temperature, are used to remove the anhydride. This method operates at higher temperatures; and the anhydride is evaporated from the surface of the fiber. The maximum temperature to which the fiber can be subjected is approximately the sublimation point of the maleic anhydride, or the boiling point of succinic anhydride, since evaporation within the body may cause bubbles or other defects. The fiber may be heated by convection from the hot gaseous medium or by radiation from the walls of the spinning cell. Generally a combination of both convection and radiation is involved, but methods involving principally radiation are generally more efficient and permit the operation with a wall temperature considerably in excess of the sublimation or boiling points of the anhydrides. The evaporation of the anhydrides from the fiber surface and the speed of the fiber prevent the filament temperature from exceeding the desired maximum. The dry spinning method is particularly adapted to the use of maleic or succinic anhydrides, especially at high rates of extrusion.

In general the methods of both wet and dry spinning commercially used are adaptable for spinning from anhydrides, but as aforementioned, special considerations are involved due to the different chemical nature of succinic and maleic anhydrides. Automatic machinery for spinning continuously, drying the thread if necessary, and winding it on suitable spools may be modified in accordance with the teaching of this specification. As in the case of most synthetic fibers, the acrylonitrile polymer fibers spun from anhydride solutions must be stretched to develop optimum physical properties. If desired, part of the necessary stretching may be accomplished in the spin bath by drawing the fiber out of the bath at a rate more rapid than the rate of extrusion.

Although the invention may be practiced with any of the modifications described in the preceding specification, it is obvious that other changes or modifications may be made without departing from the nature and spirit of the invention. The details set forth in the preceding specification are not to be construed as limitations upon the scope of the invention except to the extent set forth in the following claims.

I claim:

1. A new composition comprising a homogeneous miscible mixture of an anhydride of the group consisting of maleic anhydride and succinic anhydride, and a polymer of at least 70 per cent of acrylonitrile said polymer having a molecular weight of at least 10,000.

2. A new composition comprising a homogeneous miscible mixture of maleic anhydride, and a polymer of from 70 to 99 percent acrylonitrile and from one to 30 percent of vinyl acetate said polymer having a molecular weight of at least 10,000.

3. A new composition comprising a homogeneous miscible mixture of succinic anhydride, and a polymer of from 70 to 99 percent acrylonitrile and from one to 30 percent of vinyl acetate said polymer having a molecular weight of at least 10,000.

4. A new composition comprising a homogeneous miscible mixture of 65 to 95 percent by weight of an anhydride of the group consisting of maleic anhydride and succinic anhydride, and from 5 to 35 percent of a polymer of at least 70 percent acrylonitrile.

5. A new composition comprising a homogeneous miscible mixture of 65 to 95 percent by weight of maleic anhydride, and from 5 to 35 percent of a polymer of from 70 to 99 percent acrylonitrile and from one to 30 percent vinyl acetate.

6. A new composition comprising a homogeneous miscible mixture of 65 to 95 percent by weight of succinic anhydride, and from 5 to 35 percent of a polymer of from 70 to 99 percent acrylonitrile and from one to 30 per cent vinyl acetate.

GEORGE E. HAM.

REFERENCES CITED

The following references are of record in the file of this patent:

UNITED STATES PATENTS

| Number | Name | Date |
| --- | --- | --- |
| 2,346,107 | Johnson | Apr. 4, 1944 |
| 2,404,719 | Houtz | July 23, 1946 |